United States Patent [19]

Kanemura et al.

[11] Patent Number: 5,174,172
[45] Date of Patent: Dec. 29, 1992

[54] SPEED CHANGE GEAR SHIFTING SYSTEM FOR AUTOMOTIVE VEHICLE

[75] Inventors: Shinji Kanemura, Kawagoe; Katsuyuki Kusano, Saitama; Akihiko Tomoda, Niiza; Takahiko Adachi, Asaka; Hiroo Takemura, Wako, all of Japan

[73] Assignee: Honda Giken Kogyo Kabushiki Kaisha, Japan

[21] Appl. No.: 666,843

[22] Filed: Mar. 8, 1991

[30] Foreign Application Priority Data

Mar. 9, 1990 [JP] Japan ................ 2-24331[U]
Apr. 3, 1990 [JP] Japan ................ 2-89489

[51] Int. Cl.⁵ .............. B60K 41/06; B60K 41/08
[52] U.S. Cl. ............................. 74/857; 74/851; 74/872; 74/879
[58] Field of Search ............... 74/857, 851, 852, 872, 74/879, 859, 860, 858

[56] References Cited

U.S. PATENT DOCUMENTS

| | | | |
|---|---|---|---|
| 3,888,142 | 6/1975 | Ziegele | 74/852 |
| 4,215,596 | 8/1980 | Long | 74/851 |
| 4,226,141 | 10/1980 | Espenschied | 74/858 |
| 4,266,447 | 5/1981 | Heess et al. | 74/852 X |
| 4,270,414 | 6/1981 | Tellert | 74/852 |
| 4,493,228 | 1/1985 | Vukovich et al. | 74/858 |
| 4,593,580 | 6/1986 | Schulze | 74/858 |
| 4,677,880 | 7/1987 | Hattori et al. | 74/866 |
| 4,732,246 | 3/1988 | Tateno et al. | 192/0.052 |
| 4,788,890 | 12/1988 | Anderson | 74/851 |
| 4,825,831 | 5/1989 | Kawai | 123/360 |
| 4,838,822 | 6/1989 | Friedle et al. | 74/851 X |
| 4,973,274 | 11/1990 | Hirukawa | 74/851 X |
| 5,079,969 | 1/1992 | Kato et al. | 74/858 |

FOREIGN PATENT DOCUMENTS 2-106446  4/1990  Japan ................ 74/851

Primary Examiner—Leslie A. Braun
Assistant Examiner—David E. Henn
Attorney, Agent, or Firm—Joseph W. Berenato, III

[57] ABSTRACT

A gear shifting system for an automotive vehicle equipped with an internal combustion engine comprises a load sensor for sensing the shift load generated by a shifting motion of a driver or a rider, a power adjusting system for adjusting the engine power of the internal combustion engine, and a control unit for controlling the power adjusting system. The control unit is actuated in response to a signal from the load sensor when the sensed load is equal to or greater than a predetermined value, and outputs a control signal to the power adjusting system so as to adjust the engine power. The load sensor is assembled on a linkage system connected between a shift shaft of the power transmission and the shift pedal, so that the load sensor can detect a stretching load or a depressing load caused by shifting operation in the shift-up or shift-down mode, and for differentiating between them.

13 Claims, 9 Drawing Sheets

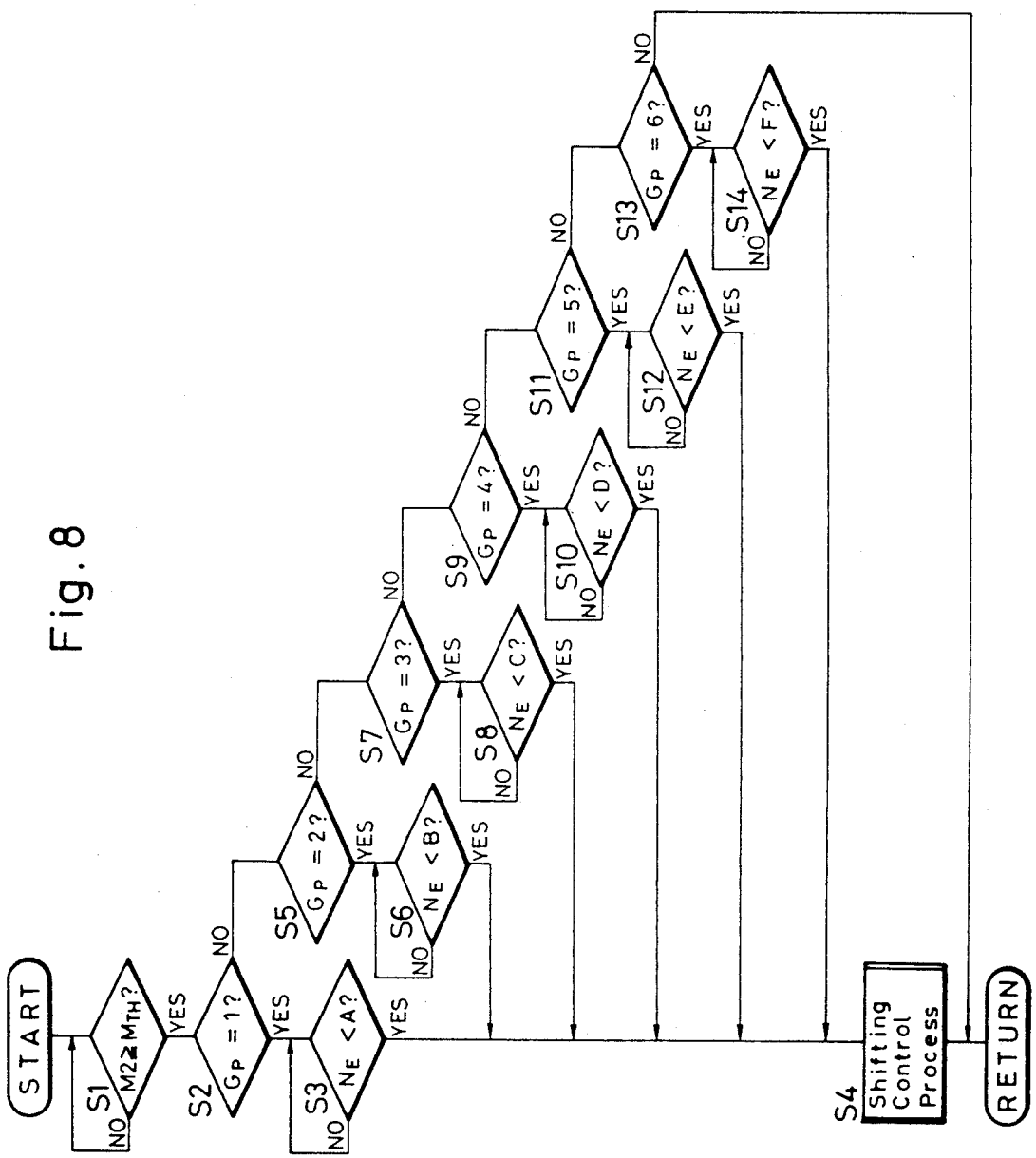

SPEED CHANGE GEAR SHIFTING SYSTEM FOR AUTOMOTIVE VEHICLE

BACKGROUND OF THE INVENTION

1. Field of the Invention

The present invention relates to an improvement in a speed change gear shifting system for an automotive vehicle, particularly for a motorcycle.

2. Description of the Prior Art

The invention will be described hereinafter in connection with a motorcycle in which it has found its most valuable application so far, but other applications will suggest themselves to those skilled in the art.

In a commonly used motorcycle, the clutch must frequently be disconnected whenever a speed change gear is shifted to vary the rate of power transmission. At the same time, the engine speed must be adjusted by operation of the throttle to facilitate effective and smooth shifting. Particularly, frequent and quick gear shifting and throttle work are required when highest performance is desired, such as in racing. Manually operated gear shifting mechanisms mounted on conventional motorcycles can not satisfy such requirements. On the other hand, electronically aided gear shifting systems without clutch operation are taught by Japanese Patent Application Laid-Open Publication No. 54-57724, corresponding to U.S. Pat. No. 4,270,414; and Japanese Patent Application No. 1-275489 applied for by the same inventor of this invention. In such electronically aided gear shifting systems, a sensing means senses the load applied to the shift lever or shift pedal when a driver or rider intends to shift the gear, and the ignition system is controlled in response to the data from the sensing means. However, these systems can not correctly discriminate between two types of shift load in the shift-up operation mode and the shift-down operation mode. These systems must be equipped with a complicated sensing means for differentiating between the shift-up and the shift-down shifting operation. For example, the shifting system provided by Japanese Patent Application No. 1-275489 uses a shift load sensor set on the shift pedal for sensing the shift load caused by the driver's shifting motion, and a torque sensor set on a drive chain for transmitting the engine power of a drive wheel for sensing the torque direction. These sensors cause complicated assembly work, thereby increasing cost and time in the manufacturing scene.

Further, the sensor set on the shift pedal can not correctly differentiate between whether the sensed load is caused by actual shifting work or the driver's foot only resting on the shift pedal. This causes some disadvantages, such as an unnecessary power decrease or power increase, or mis-shifting and so on.

BRIEF SUMMARY OF INVENTION

With these problems in mind, it is a primary object of the invention to provide a gear shifting system capable of correctly sensing actual shifting motion or load by a driver or rider to facilitate quick, smooth, and certain shifting between variable speed ranges of a power transmission in an automotive vehicle.

Another object of the invention is to provide a gear shifting system including a simple sensing means capable of discriminating between the shifting motion or load for causing shifting up and down.

To accomplish the above described objects, according to a primary aspect of the invention, a gear shifting system for a automotive vehicle equipped with an internal combustion engine comprises a load sensor for sensing the shift load generated by a shifting motion of a driver or rider, a power adjusting means for adjusting the engine power of the internal combustion engine, and a control unit for controlling the power adjusting means, the control unit being actuated in response to a signal from the load sensor when the sensed load is equivalent to or greater than a predetermined value, and outputting a control signal to the power adjusting means so as to adjust the engine power.

In the above described shifting system, the load sensor is assembled on a linkage system connected between a shift shaft of the power transmission and the shift pedal, so that the load sensor can detect stretching load or depressing load caused by shifting operation in the shift-up mode or the shift-down mode, and discriminate between them.

In the thus constituted system, the load sensor can correctly identify actual shift load, and output a shifting signal representing the shift-up mode or the shift-down mode. A control signal is outputted from the control unit in response to the shifting signal, and thus the power adjusting means can suitably adjust the engine power for either the shift-up mode or the shift-down mode. Accordingly, in the shift-up mode, the shifting operation can be achieved while keeping the throttle valve open and without any clutch work, and in the shift-down mode the shifting operation can be achieved while keeping the throttle valve closed and without any clutch work.

Other features and advantages of the invention will be apparent from the following description taken in connection with the accompanying drawings.

BRIEF DESCRIPTION OF THE DRAWING

FIG. 8 is a flow chart showing one example of the shifting operation control process in the shift-down mode according to the second embodiment of the invention;

DETAILED DESCRIPTION OF THE PREFERRED EMBODIMENT

Figure 1:
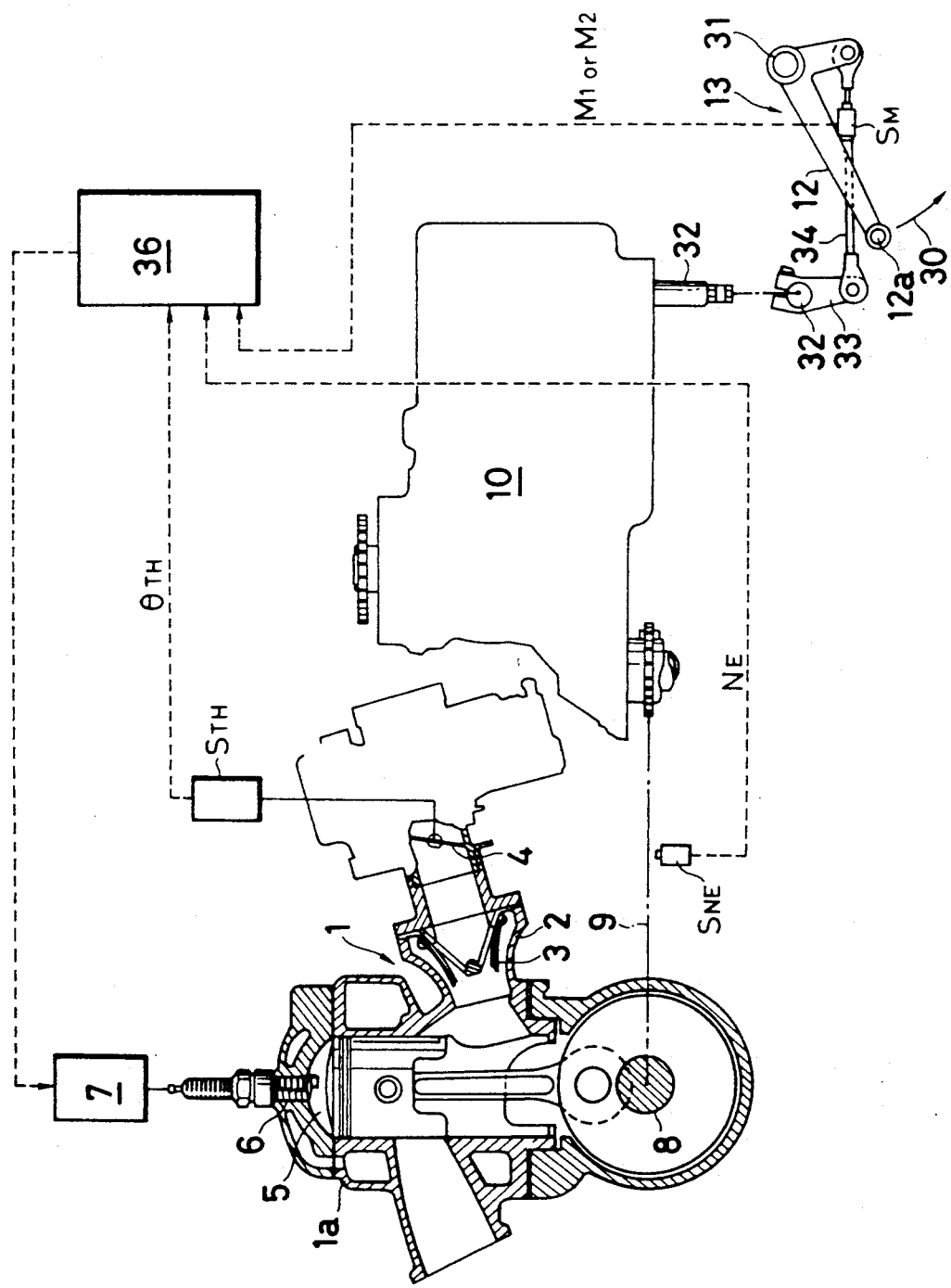
FIG. 1 is a schematic illustration showing the overall constitution of the shifting system according to a first embodiment of the invention.

Referring now to the drawings in detail, and initially to FIG. 1, there is shown an overall constitution of the shifting system according to the invention. In FIG. 1, the numeral 1 denotes a two cycle engine which is normally utilized with a motorcycle. The engine 1 includes an air intake pipe 2 in which reed valve 3 is installed, and a throttle valve 4 set up stream of the reed valve 3. The throttle valve 4 is provided with a throttle sensor $S_{TH}$ which detects throttling degree $\Theta_{TH}$, i.e., opening degree of the throttle valve 4. An ignition plug 6 is set at the top of an engine body 1a so that the ignition terminal of the plug 6 faces the combustion chamber 5 of the engine 1.

The ignition plug 6 is electrically connected to an ignition control device 7 as an engine power adjusting means. The engine 1 further includes a crank shaft 8 which is mechanically connected to a transmission unit 10 through power output mechanism 9. The crank shaft 8 is provided with a speed sensor $S_{NE}$ for detecting the revolving or rotational speed $N_E$ of the engine 1. The transmission unit 10 is further mechanically connected to a shifting mechanism 13, which includes a shift pedal 12 through which a driver or rider of this motorcycle can apply a shifting load M to the transmission unit 10. The shifting mechanism 13 further includes a shifting load sensor $S_M$ which senses the shifting load M.

Figure 2:
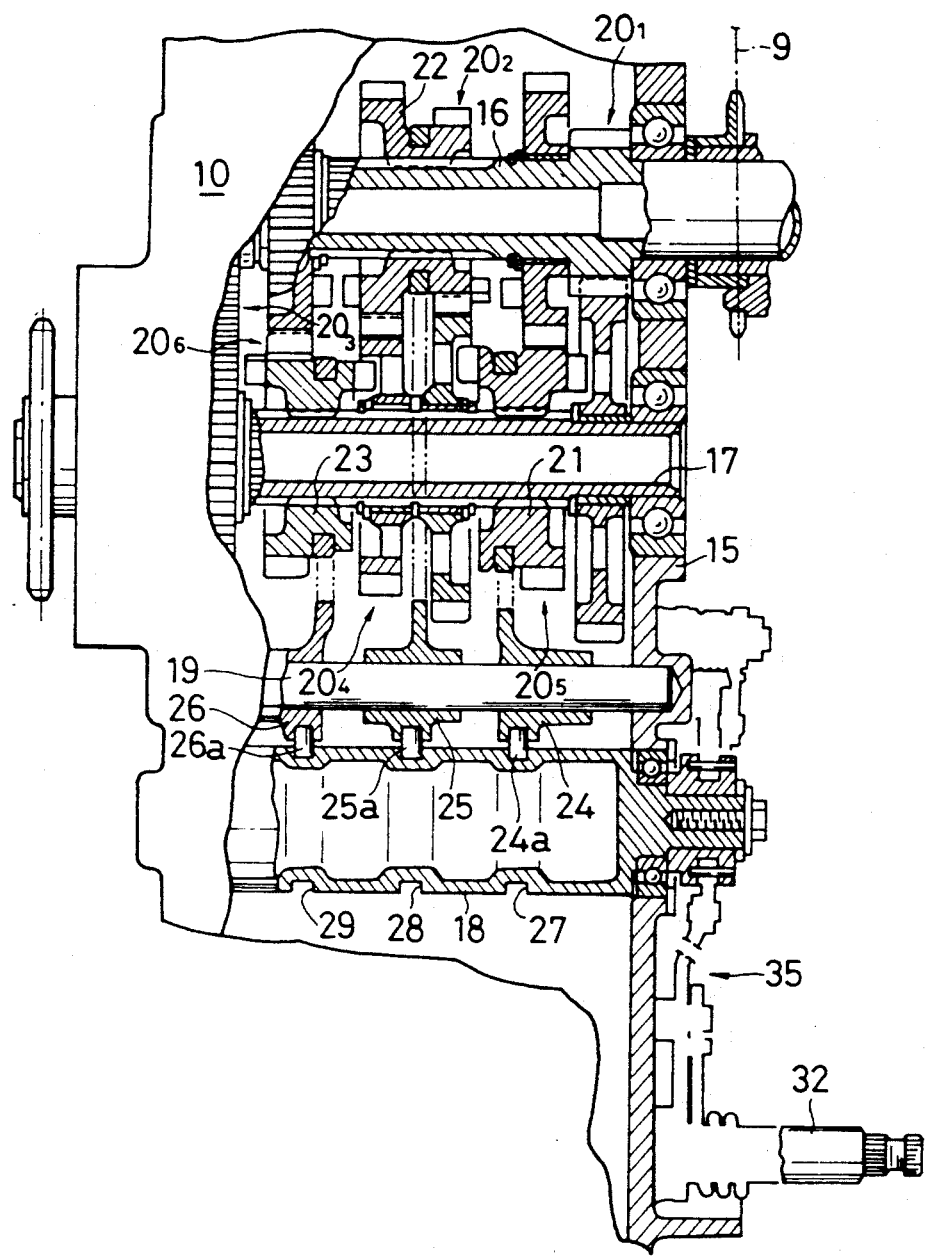
FIG. 2 is a fragmentary cross sectional view showing the power transmission which is utilized with the shifting system according to the first embodiment of the invention.

Referring to FIG. 2, there is shown one example of a transmission unit 10 having six variable speed ranges. In a transmission housing 15 of transmission unit 10, a main shaft 16 is connected to the crank shaft 8 through the power output mechanism 9, a counter shaft 17 is connected to a rear drive wheel through a drive chain, not shown, and a shift drum 18 is rotatably arranged, with shafts 16 and 17 and drum 18 being parallel to each other. Further, shifter guide shaft 19 is assembled in stationary manner within the housing 15, and also in parallel with the main shaft 16, the counter shaft 17 and the shift drum 18. Between the main shaft 16 and the counter shaft 17, a plurality of gear units $20_1$, $20_2$, $20_3$, $20_4$, $20_5$ and $20_6$ are so arranged as to provide a first speed range, a second speed range, a third speed range, a fourth speed range, a fifth speed range and a sixth speed range, respectively. On the shifter guide shaft 19, three shifters 24, 25 and 26 are slidably mounted in the axial direction, and respectively engaged with shaft gears 21, 22 and 23. The shifters 24, 25 and 26 are integrally fixed with guide pins 24a, 25a and 26a, and are relatively and movably engaged with lead grooves 27, 28 and 29 formed in the external surface of the shift drum 18.

In the transmission unit 10, the shift drum 18 is revolvingly moved at angles of regular interval by the shifting motion of the shifting mechanism 13. The shifters 24, 25 and 26 are selectively driven in response to the revolving motion of the shift drum 18, and thus one of the gear units $20_1$, $20_2$, $20_3$, $20_4$, $20_5$ and $20_6$ is utilized for varying the revolution speed to be transmitted to the rear wheel.

Returning to FIG. 1, the shifting mechanism 13 prepares to shift to the shift-up mode when the driver or rider depresses the shift pedal 12 in the direction represented by arrow 30. On the other hand, the shifting mechanism 13 prepares to shift to the shift-down mode when the shift pedal 12 is moved in the direction opposite to that of arrow 30. The shift pedal 12 is substantially of L-shape, and one end is provided with a foot step 12a and has a cranked section pivotedly supported on the motorcycle body through a pivot 31. The shifting mechanism 13 further includes an arm 33 whose one end is secured to shift shaft 32 supported by the transmission housing 15, and link 34 is connected between the other end of the arm 33 and the shift pedal 12. The shift load sensor $S_M$ is interposed at essentially the intermediate section of the link 34. The shift shaft 32 and the shift drum 18 are mechanically connected through a commonly known linkage mechanism 35, so that the shift drum 18 is actuated by the shifting motion of the shift pedal 12 through the linkage mechanism 35.

In the shifting mechanism 13, the shift load sensor $S_M$ is subjected to stretching force when in the shift-up mode. The sensor $S_M$ outputs an electrical signal representing a shift-up load M1 in response to the load attributable to the stretching force. On the other hand, in the shift-down mode, since the sensor $S_M$ is subjected to a depressing force, the sensor $S_M$ outputs another electrical signal representing a shift-down load M2 in response to the load owing to the depressing force.

The throttling degree $\Theta_{TH}$ detected by the throttle sensor $S_{TH}$, the engine speed $N_E$ detected by the engine speed sensor $S_{NE}$, and the shift load M1 or M2 detected by the shift load sensor $S_M$ are fed to a control unit 36 mainly comprised of a microcomputer. The control unit 36 outputs a control signal to the ignition control device 7 in response to the throttling degree $\Theta_{TH}$, the engine speed $N_E$, and the shift load M1 (or M2) so as to allow the transmission unit 10 to vary the revolution speed to be transmitted to the rear wheel, while keeping the throttle valve 4 open (or closed) and the clutch connected. Alternatively, the control unit 36 does not output the control signal to the ignition control device 7 when the rate of increase in the shift load M1 (or M2) does not exceed a predetermined value, so that the engine power is not changed.

Figure 3:
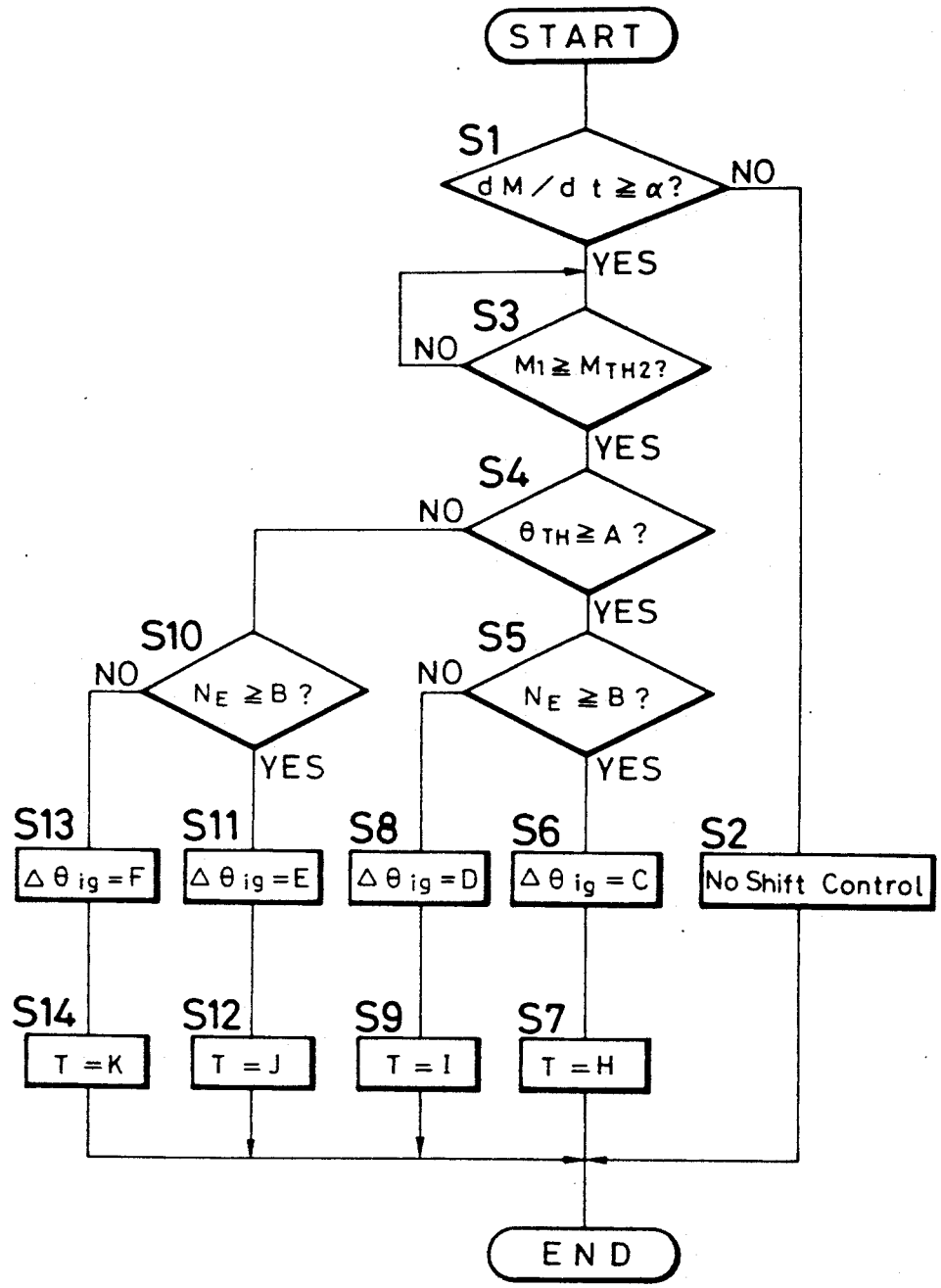
FIG. 3 is a flow chart showing one example of the shifting operation control process in the shift-up mode according to the first embodiment of the invention.

Referring to FIG. 3, there is shown one example of a flow chart of the control process for shift-up operation performed by the control unit 36. In this drawing, at the first step S1, the rate of increase (dM/dt) in the shift load M1 is compared with a predetermined value $\alpha$ to determine whether the rate dM/dt is equal to or greater than the value $\alpha$ or not. When the rate dM/dt is less than the value $\alpha$, the process progresses to the second step S2. Alternatively, when the rate dM/dt is at least equal to the value $\alpha$, then the process progresses to the third step S3.

Figure 4:
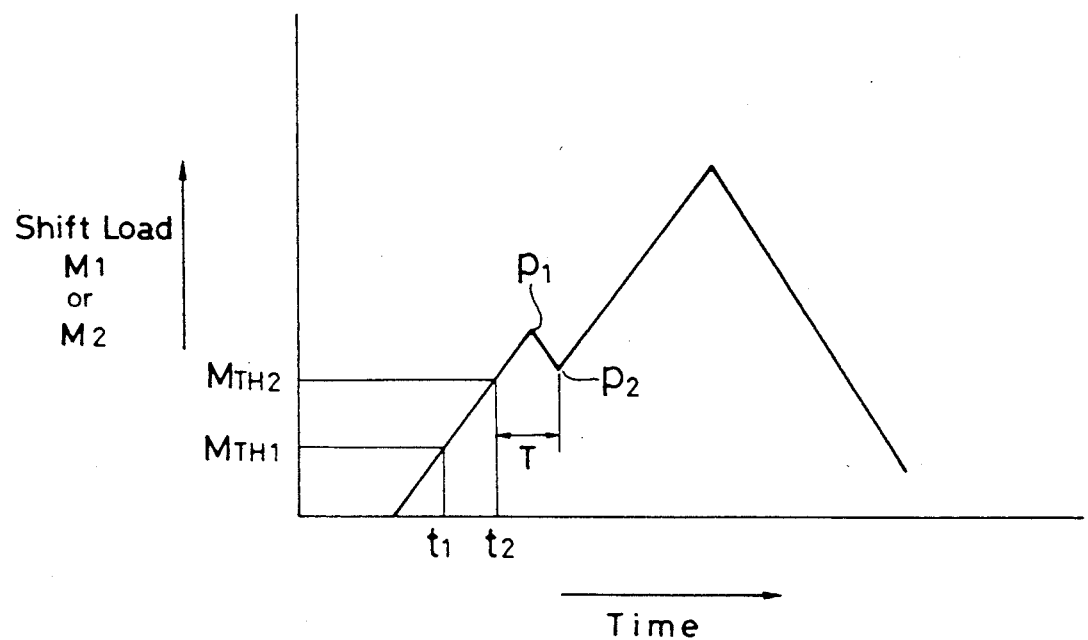
FIG. 4 is a graph showing the relationship between the change of shift load and the shifting time.

At the first step S1, the rate dM/dt is defined by the graph representing the relation between the increase of the shift load M1 and a certain period of time as shown in FIG. 4. A time difference $\Delta T$ between a first time $t_1$ when the shift load M1 reaches a first reference value $M_{TH1}$ and a second time $t_2$ when the shift load M1 reaches a second reference value $M_{TH2}$ greater than the first reference value $M_{TH1}$, is compared with a predetermined value.

When the time difference $\Delta T$ exceeds the predetermined value, which in this case is represented by dM/dt < $\alpha$, the control process progresses to the second step S2 where the shift control is prohibited.

When the time difference $\Delta T$ does not exceed the predetermined value, which in that case is represented by $dM/dt \geq \alpha$, the control process progresses from the first step S1 to the third step S3.

The third step S3 determines whether the shift load M1 exceeds the second reference load $M_{TH2}$ or not. The control process progresses to a fourth step S4 only when the shift load M1 is equal to or greater than the second reference load $M_{TH2}$.

At the fourth step S4, the throttling degree $\Theta_{TH}$ is compared with a throttling degree reference value A previously given to determine whether $\Theta_{TH} \geq A$ or not. The control process progresses to fifth step S5 when the answer is YES. Alternatively, the control process progresses to a tenth step S10 when the answer is NO; i.e., $\Theta_{TH} < A$.

At the fifth step S5, the engine speed $N_E$ is compared with an engine speed reference value B previously given to determine whether $N_E \geq B$ or not. The control process progresses to a sixth step S6 when the answer is YES. Alternatively, the control process progresses to an eighth step S8 when the answer is NO; i.e., $N_E < B$.

At the sixth step S6, an ignition timing compensation value $\Delta\Theta_{ig}$, which is a control signal supplied to the ignition control device 7 to adjust the ignition timing of the ignition plug, is set to "C" and causes the engine power to decrease. Subsequent to this sixth step S6, at a seventh step S7, a period T for maintaining the ignition timing compensation value $\Delta\Theta_{ig}$ is set to "H".

When the control process progresses from the fifth step S5 to the eighth step S8 and a ninth step S9, the ignition timing compensation value $\Delta\Theta_{ig}$ is set to "D", and the period T is set to "I", respectively.

When the control process progresses from the fourth step S4 to the tenth step S10, the engine speed $N_E$ is compared with the engine speed reference value B to determine whether $N_E \geq B$ or not. The control process progresses to an eleventh step S11 and a twelfth step S12 in regular sequence when the answer is YES. Finally, the ignition timing compensation value $\Delta\Theta_{ig}$ is set to "E" and the period T is set to "J", respectively.

Alternatively, the process progresses to a thirteenth step S13 and a fourteenth step S14 when the answer is NO. The ignition timing compensation value $\Delta\Theta_{ig}$ is set to "F" and the period T is set to "K", respectively.

In the shifting operation, when the shift pedal 12 is in the shift-up mode wherein the throttle valve 4 is kept open and the clutch is kept connected, the shift drum 18 is actuated by the shifting force from the shift pedal 12. Then, in ordinary cases, the shift drum 18 selectively causes one of the shifters 24, 25 and 26 to slide. But in this case, the main shaft 16 is supplied with the engine power from the crank shaft 8 and one of the gear units $20_1$, $20_2$, $20_3$, $20_4$, $20_5$ and $20_6$ to which it is firmly engaged. This gear engagement provides a great resistance force against the sliding motion of the shifters 24 to 26, so that the shift drum 18 can not be revolved. Thus the stretching force applied by the shift pedal 12 is fully applied to the shift load sensor $S_M$. This stretching force corresponds to the shift load M1 detected by the sensor $S_M$, and the third step S3 determines whether the shift load M1 exceeds the second reference load $M_{TH2}$ or not, as shown in FIG. 4.

Figure 5:
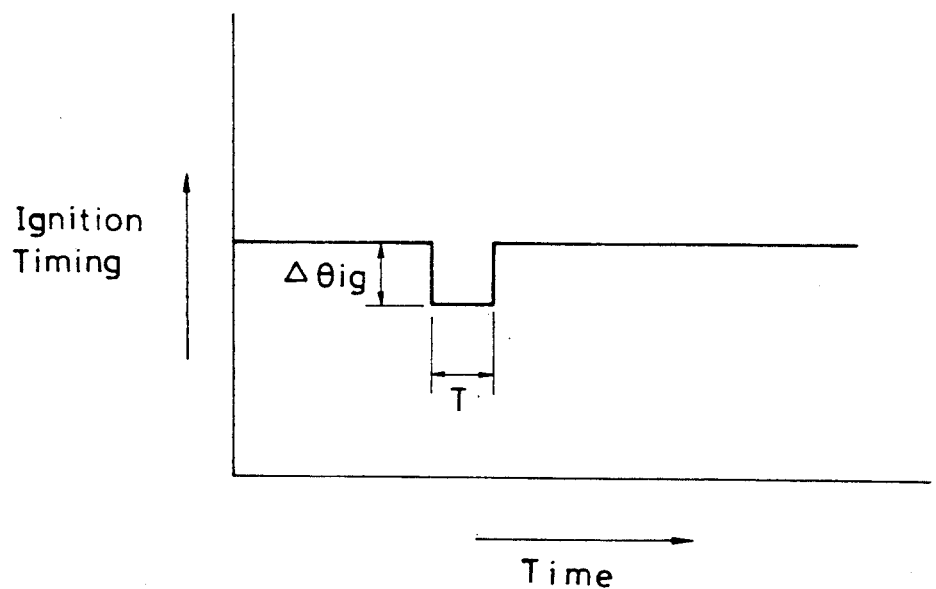
FIG. 5 is a graph showing the relationship between the change of ignition timing in response to the change of shift load and the shifting time.

When the shift load M is equivalent to or greater than the reference load $M_{TH2}$, then this means the driver or rider intends to shift the speed change gear, and the control unit 36 outputs a command signal to the ignition control device 7. According to this command signal, the ignition timing is varied in response to the ignition timing compensation value $\Delta\Theta_{ig}$, and this varied state is continued for the period T as shown in FIG. 5.

Further, if the throttling degree $\Theta_{TH}$ is equal to or greater than the throttling degree reference value A and the engine speed $N_E$ is equal to or greater than the engine speed reference value B, then the engine is revolved at a high speed and the throttle valve is fully opened, and the control unit 36 will output a first command signal representing $\Delta\Theta_{ig} = C$ and $T = H$.

If the throttling degree $\Theta_{TH}$ is equal to or greater than the throttling degree reference value A and the engine speed $N_E$ is less than the engine speed reference value B, then the engine is revolving at a low speed and the throttle valve is fully opened, and the control unit 36 will output a second command signal representing $\Delta\Theta_{ig} = D$ and $T = I$.

If the throttling degree $\Theta_{TH}$ is smaller than the throttling degree reference value A and the engine speed $N_E$ is equal to or greater than the engine speed reference value B, then the engine is revolving at a high speed and the throttle valve is regulated for a constant speed driving, and the control unit 36 will output a third command signal representing $\Delta\Theta_{ig} = E$ and $T = J$.

If the throttling degree $\Theta_{TH}$ is smaller than the throttling degree reference value A and the engine speed $N_E$ is smaller than the engine speed reference value B, then the engine is revolving at a low speed and the throttle valve is regulated for a constant speed driving, and the control unit 36 will output a fourth command signal representing $\Delta\Theta_{ig} = F$ and $T = K$.

According to the above four command signals in response to the throttling degree $\Theta_{TH}$ and the engine speed $N_E$, the ignition timing compensation value $\Delta\Theta_{ig}$ and its period T are correctly given to the ignition control device 7 to temporarily decrease the engine power of the engine 1. As the engine power is decreased, the set-up unit of the gear units $20_1$, $20_2$, $20_3$, $20_4$, $20_5$ and $20_6$ is temporarily freed from the engine power, and thus the friction force attributable to the meshingly engagement among the gears also becomes reduced. Then the shift drum 18 can be easily and smoothly revolved and the selected shifter 24, 25 or 26 may also be shifted to its shifted position. During this shifting operation, the throttle valve 4 is continuously opened. This ensures elimination of the delay in varying the engine power attributable to the throttle operation, and to perform the shift-up operation without operating the clutch.

An actual and sequential operation of this configured embodiment will be explained in detail.

When the rate $dM/dt$ of increase in the shift load M1 is less than the value $\alpha$, then this means that the foot of the driver or rider is only resting on the shift pedal 12. The engine power is therefore not lowered, and shifting operation of the transmission 10 does not occur.

Alternatively, in the case that the driver or rider consciously depresses the shift pedal 12 to shift the gear ratio of the transmission 10, the ignition timing is varied in response to the ignition timing compensation value $\Delta\Theta_{ig}$ when the shift load M1 is equal to or greater than the second reference value $M_{TH2}$. Thus the engine power is decreased. As shown in FIG. 4, the shift-up operation starts at the first position $P_1$ and the shift load M1 is decreased. At the second position, the shift-up operation is terminated and the shift load M1 is increased again.

The above explanation was described for operation in the shift-up mode, but the control unit 36 of this embodiment can be applied to the shift-down mode. The shift load sensor $S_M$ detects the depressed load attributable to the shift-down motion of the shift pedal 12 when the throttle valve 4 is fully closed or slightly opened. When the rate of increase of the depressed load is equal to or greater than a predetermined value, then the control unit 36 operates in essentially the same control process manner for the above described shift-up mode shown in FIG. 3 to temporarily and slightly increase the output power of the engine 1.

Although the power of the engine 1 is controlled by adjusting the ignition timing to facilitate shifting in the above described first embodiment, the control for the engine power is not limited to this manner and various parameters, such as fuel and air mixture, intake rate of air, exhaust timing, and so, on may be used for this control.

Figure 6:
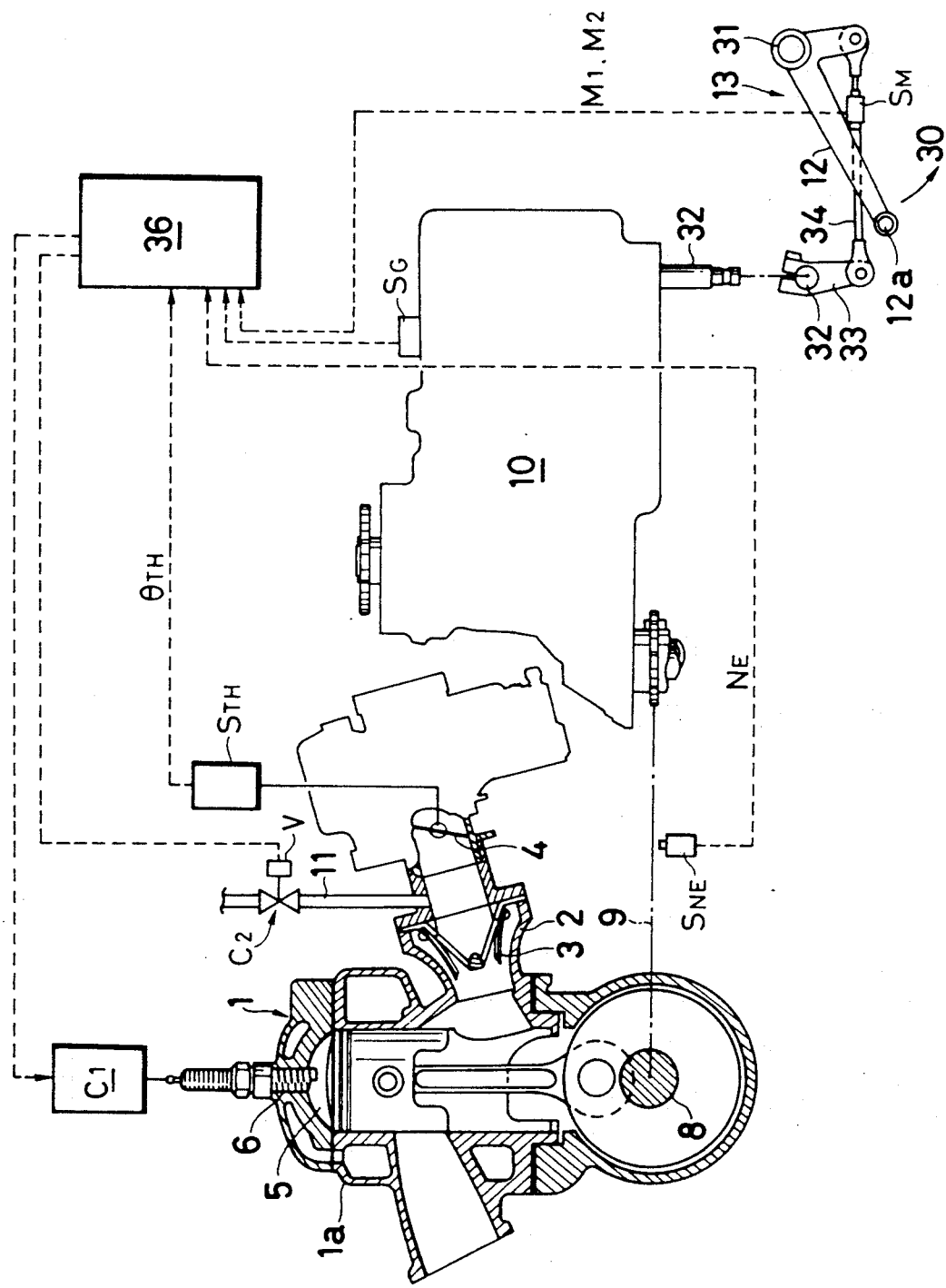
FIG. 6 is a schematic illustration showing the overall constitution of the shifting system according to a second embodiment of the invention.

Referring to FIG. 6, there is shown an overall view of the shifting system according to a second embodiment of the present invention. This has the same construction as the above described first embodiment, except that the engine 1 is provided with two engine power control means $C_1$ and $C_2$ and the transmission 10 is also provided with a shift position sensor $S_G$. The components and the electrical signals outputted from these components of the second embodiment corresponding to those of the first embodiment are denoted by the same numerals and symbols so that the same explanation will not be repeated.

The first control means $C_1$ corresponds to the ignition control device 7 of FIG. 1, and the second control means $C_2$ includes an air inlet tube 11 whose one end is connected to an air cleaner, not shown, and the other end of which is connected to the air intake pipe 2 disposed between the reed valve 3 and the throttle valve 4, and an electromagnetic valve V interposed in the path of the air inlet tube 11.

Figure 7:
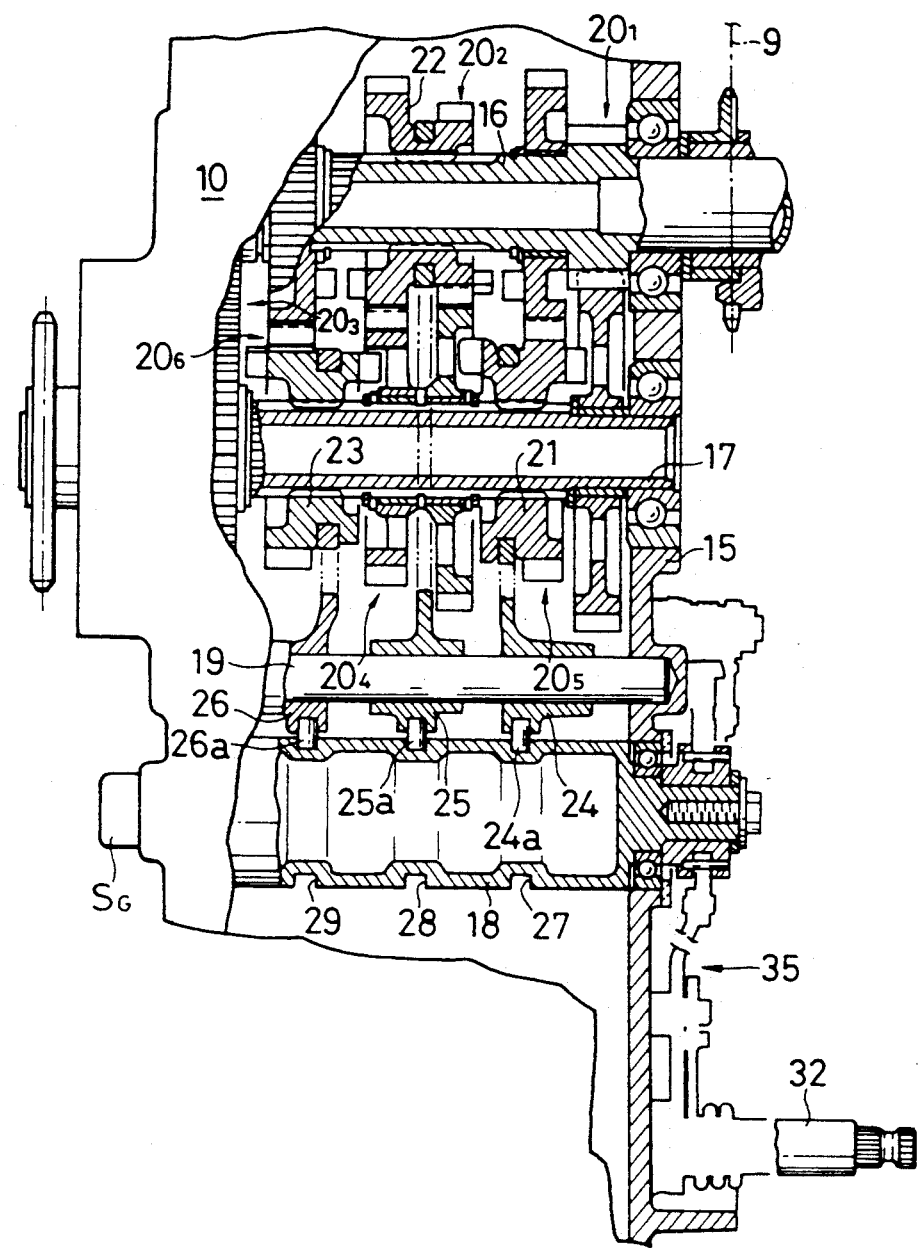
FIG. 7 is a fragmentary cross sectional view showing the power transmission which is utilized with the shifting system according to the second embodiment of the invention.

As shown in FIG. 7, the shift position sensor $S_G$ is assembled on the transmission housing 15 for detecting the set-up of the gear units $20_1$, $20_2$, $20_3$, $20_4$, $20_5$ and $20_6$. In the transmission 10 according to this second embodiment, the shift position sensor $S_G$ is so arranged as to detect the angular position of the shift drum 18, and to output the detected position as a shift position signal $G_P$ to the control unit 36.

Thus, the control unit 36 outputs a first control signal to the first engine power control means $C_G$, and a second control signal to the electromagnetic valve V of the second control means $C_2$ in response to the throttling degree $\Theta_{TH}$, the engine speed $N_E$, the shift position $G_P$, and the shift load $M_1$ or $M_2$.

Referring to FIG. 8, there is shown one example of a flow chart of the control process for shift-down operation performed by the control unit 36. In this drawing, at a first step S1 the shift load M2 is compared with a predetermined value $M_{TH}$ to determine whether the shift load M2 is equal to or greater than the value $M_{TH}$ or not. The process progresses to a second step S2 only when $M2 \geq M_{TH}$.

Figure 9A:
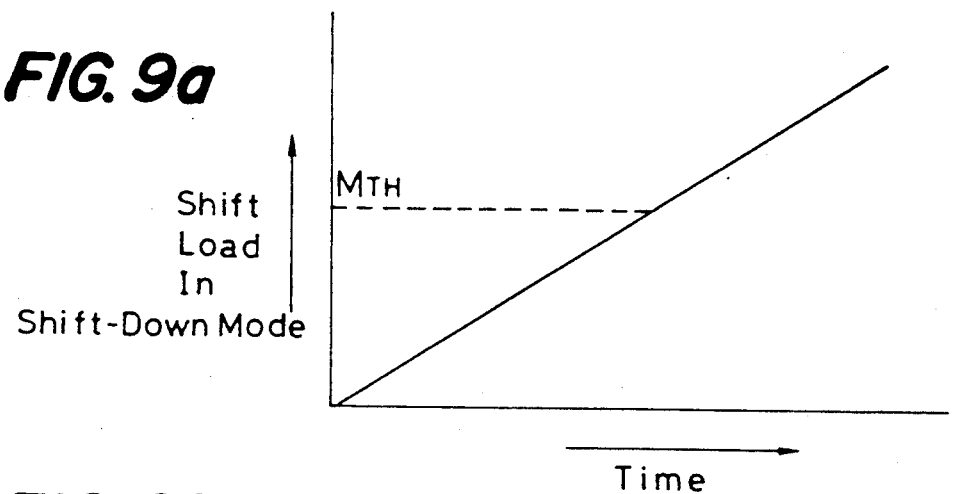
FIG. 9(a), (b) and (c) are graphs showing the change of shift load with time, and the valve alternation with time, respectively.

When the shift pedal 12 is in the shift-down mode wherein the throttle valve 4 is fully closed or slightly opened and the clutch is kept connected, the shift drum 18 is actuated by the shifting force from the shift pedal 12. Then, in ordinary cases, the shift drum 18 selectively causes one of the shifters 24, 25 and 26 to slide. But, in this case, the main shaft 16 and the counter shaft 17 are supplied with the counter power of the engine brake effect attributable to the difference between the engine revolving speed and the actual driving speed of the drive wheel, which is at a higher speed than the engine, and one of the gear units $20_1$, $20_2$, $20_3$, $20_4$, $20_5$ and $20_6$ is firmly engaged. This gear engagement provides a great resistance force against the sliding motion of the shifters 24 to 26, so that the shift drum 18 cannot revolve. Thus, the depressing force applied by the shift pedal 12 is fully applied to the shift load sensor $S_M$. This depressing force corresponds to the shift load M2 detected by the sensor $S_M$, and the first step S1 determines whether the shift load M2 exceeds the predetermined load $M_{TH}$ or not, as shown in FIG. 9(a). This can determine whether actual shifting operation in the shift-down mode is beginning.

At the second step S2, the shift position $G_P$ detected by the shift position sensor $S_G$ is checked to determine whether the shift position $G_P$ is at the first speed range or not. When the answer is YES, the control process progresses to third step S3.

At the third step S3, the engine speed $N_E$ is compared with an engine speed reference value A previously given to determine $N_E < A$ or not. The control process progresses to fourth step S4 only when the answer is YES.

At the second step S2, the control process progresses to a fifth step S5 when the shift position is not positioned at the first speed range.

At the fifth step S5, the shift position is checked to determine whether it is positioned at the second speed range or not. The process progresses to sixth step S6 when the answer is YES.

At the sixth step S6, the engine speed $N_E$ is compared with an engine speed reference value B to determine whether $N_E < B$ or not. The process progresses to the fourth step S4 only when the answer is YES.

Figure 10:
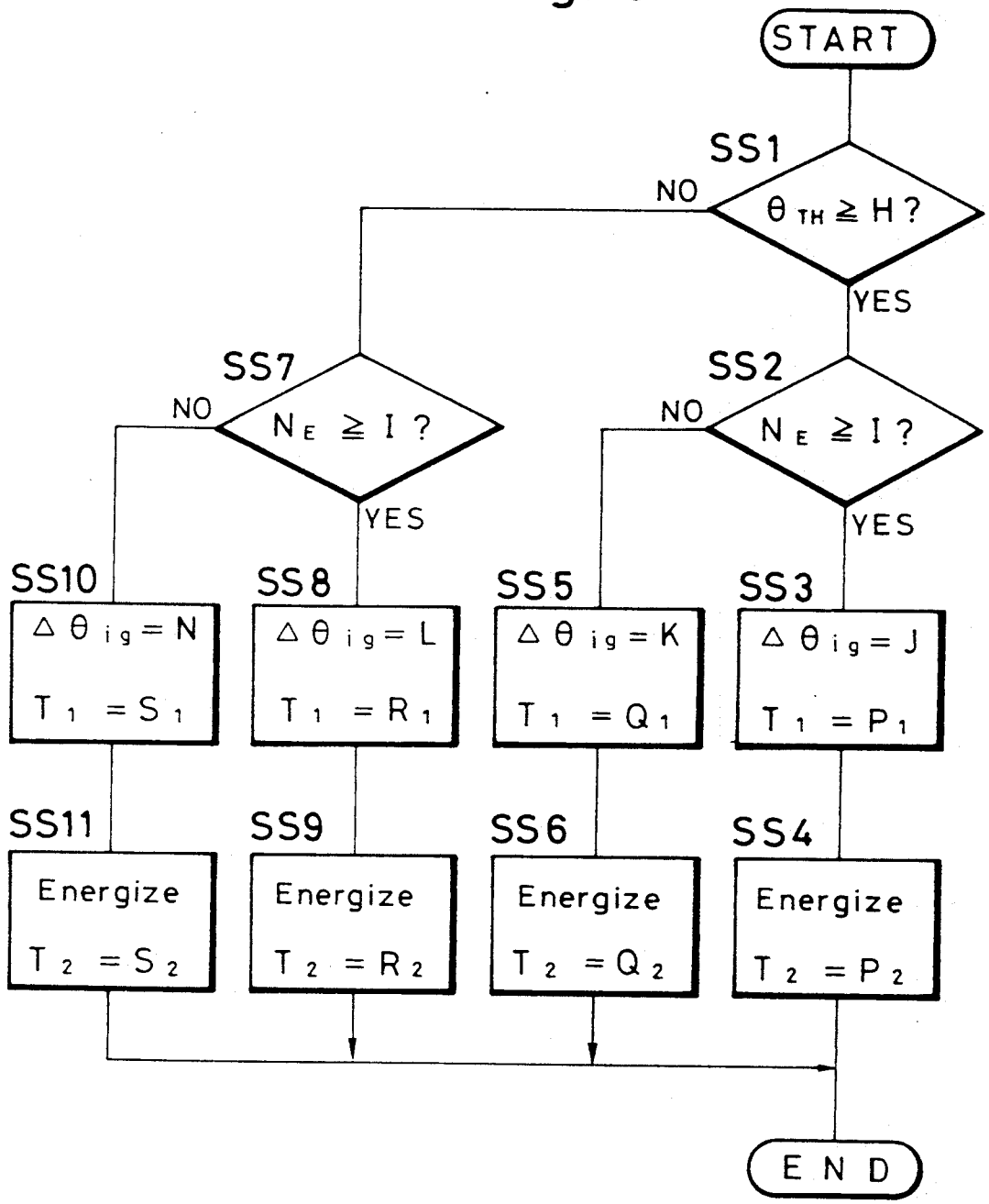
FIG. 10 is a flow chart showing one example of the shifting operation control process in the shift-down mode according to the flow chart of FIG. 8.

In this control process, the same determinations performed at the first and second speed ranges by the second and fifth steps will be repeated from seventh step S7 to fourteenth step S14. When the answer is YES at each step, the control process progresses to the fourth step S4 when the engine speed $N_E$ is less than each reference value; that is, $N_E < A$ is at the first speed range, $N_E < B$ is at the second speed range, $N_E < C$ is at the third speed range, $N_E < D$ is at the fourth speed range, $N_E < E$ is at the fifth speed range, and $N_E < F$ is at the sixth speed range. At the fourth step S4, a power shift-down operation will be performed by a subsequent control process, as shown in FIG. 10, referred to later. In other words, the power shift-down operation will start only when the engine speed $N_E$ detected for each speed range is always lower than the engine speed reference value A, B, C, D, E or F previously determined for each engine speed range. This restriction ensures that the shift-down operation can be smoothly performed, without excessive revolution of the engine 1.

FIG. 10 is a flow chart showing one example of the control process for the power shift-down operation performed at the forth step S4 in the preceding control process of FIG. 8.

At the first step SS1, the throttling degree $\Theta_{TH}$ is compared with a throttling degree reference value H The control process progresses to second step SS2 when previously given to determining whether $\Theta_{TH} \geq H$ or not. the answer is YES. Alternatively, the control process progresses to seventh step SS7 when the answer is NO; i.e., $\Theta_{TH} < H$.

At the second step SS2, the engine speed $N_E$ is compared with an engine speed reference value I to determine whether $N_E \geq 1$ or not. The process progresses to third step SS3 when the answer is YES. Alternatively, the control process progresses to fifth step SS5 when the answer is NO; i.e., $N_E < 1$.

At the third step SS3, an ignition timing compensation value $\Delta\Theta_{ig}$, which is a control signal supplied to the ignition control device 7 by the first engine power control means $C_1$ to adjust the ignition timing of the ignition plug, is set to "J" and causes the engine power to increase. At the same time, the period $T_1$ for maintaining the ignition timing compensation value $\Delta\Theta_{ig}$ is set to "$P_1$".

Subsequently, the control process progresses to fourth step SS4, at which an actuating signal is outputted to the electromagnetic valve V by the second engine power control means $C_2$ to open the valve V, and the period $T_2$ for keeping the valve V opening is set to "$P_2$".

When the control process progresses from the second step SS2 to the fifth step SS5, the ignition timing compensation value $\Delta\Theta_{ig}$ is set to "K" and the period $T_1$ is set to "$Q_1$", and then the period $T_2$ for keeping the valve V open is set to $Q_2$ by the fifth step SS5 and a sixth step SS6, respectively.

When the control process progresses from the first step SS1 to the seventh step SS7, the engine speed $N_E$ is compared with the engine speed reference value 1 to determine whether $N_E \geq 1$ or not. The control process progresses to eighth step SS8 and ninth step SS9 in regular sequence when the answer is YES. The ignition timing compensation value $\Delta\Theta_{ig}$ is set to "L" and the period $T_1$ is set to "$R_1$", and then the period $T_2$ for keeping the electromagnetic valve V open is set to $R_2$, respectively. Alternatively, the process sequentially progresses to tenth step SS10 and eleventh step SS11 when the answer is NO. The ignition timing compensation value $\Delta\Theta_{ig}$ to N and the period $T_1$ is set to $S_1$, and then the period $T_2$ for keeping the electromagnetic valve V open is set to $S_2$, respectively.

Figure 9B:
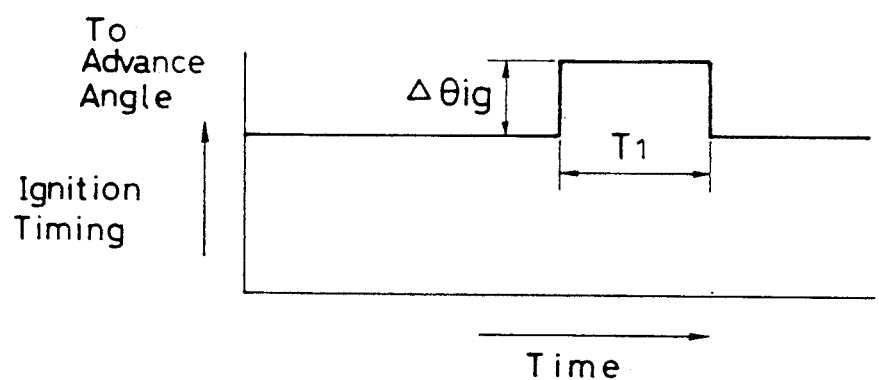
Figure 9C:
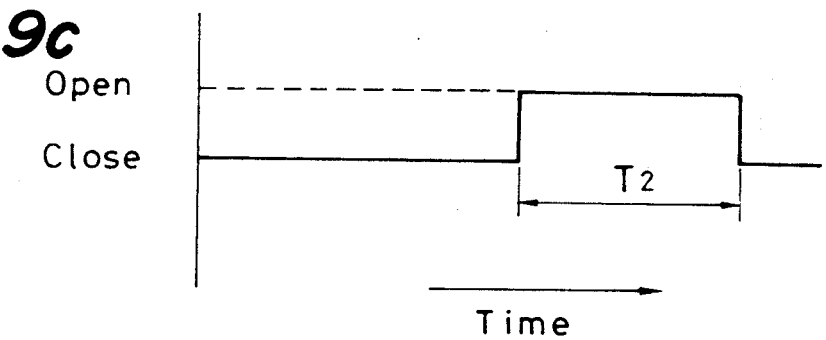

When the shift load in the shift-down mode is detected, the control unit 36 outputs a command signal to the first engine power control C1 only when the engine speed $N_E$ detected for each speed range is always less than the engine speed reference value A, B, C, D, E or F previously determined for each engine speed range. According to this command signal, the ignition timing is varied, for example advanced in response to the ignition timing compensation value $\Delta\Theta_{ig}$, and this varied stated is continued for the period $T_1$, as shown in FIG. 9(b). Simultaneously, the control unit 36 also outputs a second command signal to the electromagnetic valve V by the second engine power control means $C_2$. According to this second command signal, the valve V opens to introduce ambient air into the air intake pipe 2 through the air inlet tube 11, and the opening state of valve V is maintained for the period $T_2$, as shown in FIG. 9(c).

In the manner described above, the engine power is temporarily increased by controlling the various parameters, such as the ignition timing compensation value $\Delta\Theta_{ig}$, the period $T_1$ for maintaining the value $\Delta\Theta_{ig}$, and the period $T_2$ for opening the valve V, to control the rate of air intake.

An actual and sequential operation of this configured embodiment will be explained in detail.

In order to decelerate the running motorcycle, the driver or rider consciously depresses the shift pedal 12 to shift-down the gear ratio of the transmission 10, thereby making the throttle valve fully closed or slightly open. The ignition timing is varied in response to the ignition timing compensation value $\Delta\Theta_{ig}$ when the shift load M2 is equal to or greater than the reference value $M_{TH}$, and this state is maintained for the period $T_1$. Simultaneously, the electromagnetic valve V is opened for the period $T_2$ to introduce ambient air into the intake pipe 2. Thus, the engine power is increased and the set-up unit of the gear units $20_1$, $20_2$, $20_3$, $20_4$, $20_5$ and $20_6$ is freed from the counter force of the engine brake effect. Then, the shift drum 18 can be easily and smoothly revolved, and the selected shifter 24, 25 or 26 can be also shifted to its shifted position. During this shifting operation, the adjustment of the throttle valve 4 and the clutch is not required.

This shift system allows the driver or rider of the motorcycle to operate only the shift pedal 12, even though the running speed of the motorcycle is quickly decreased from the high speed running state. As explained above, this shift system ensures easy and smooth performance of the shifting operation without requiring throttle and clutch operation, thereby reducing the driver's fatigue and improving his safety.

In this second embodiment, the ignition timing control means and the intake air control means are simultaneously actuated to increase the engine power for the shifting operation in the shift-down mode. The present invention is not however limited to only this system, but it may employ either one of these control means capable of being actuated in isolation, or a combination of any engine power control means, such as an exhaust gas control means or an air-fuel ratio control means.

Further, it is needless to say that the shifting system disclosed in the second embodiment may be modified or adapted for the shift-up mode shifting operation by one skilled in the art.

As many apparent, widely different embodiments of this invention may be made without departing from the spirit and scope thereof, and it is to be understood that the invention is not limited to the specific embodiments thereof except as defined in the appended claims.

We claim:

1. An automatic gear shifting system for an automotive vehicle having an internal combustion engine and a manual shifter for shifting the transmission between a plurality of geared orientations, the system comprising:
   (a) a load sensor for sensing the load applied to the shifter by a user, and for generating a signal in response thereto;
   (b) power adjusting means operably associatable with the engine for adjusting the power thereof;
   (c) a control unit operably associated with said sensor and said power adjusting means for controlling operation of said power adjusting means, said control unit includes first means for causing a control signal to be outputted to said power adjusting means for controlling operation thereof when the load sensor signal is equal to or greater than a first predetermined value; and
   (d) said control unit further includes means for comparing the rate of increase in the load applied to the shifter and for initiating a shift operation control process for the engine when said comparing means determines that the rate of increase of the shifter load exceeds a second predetermined value.

2. The system of claim 1, wherein:
   (a) said load sensor outputs a first signal when the shifter is shifted up, and a second signal when the shifter is shifted down.

3. The system of claim 2, wherein:
(a) said power adjusting means is adapted for decreasing the engine power when the shifter is shifted up, and for increasing the engine power when the shifter is shifted down.

4. The system of claim 3, wherein:
(a) said power adjusting means includes means for adjusting the ignition timing of the engine, and for adjusting the air intake rate of the engine.

5. The system of claim 1, wherein:
(a) said control unit is operably connectable with an engine speed sensor and an engine throttle sensor for detecting the engine speed and the degree of the throttle, and for outputting a fourth control signal to said power adjusting means in response thereto.

6. The system of claim 5, wherein:
(a) said control unit is operably connectable with a shifter position sensor associated with the shifter for determining the geared orientation of the transmission, and for outputting a further control signal to said power adjusting means in response thereto.

7. A gear shifting system for a vehicle, comprising:
(a) a vehicle having an engine, a transmission with a plurality of geared orientations, and a manually operable shifter for shifting the transmission between the orientations;
(b) a load sensor operably associated with said shifter for sensing the load applied to said sensor by a user, and for generating a signal in response thereto;
(c) means operably associated with said engine for adjusting the power thereof;
(d) a control unit operably associated with said sensor and with said adjusting means for controlling operation of said adjusting means, said control unit includes first means for causing a control signal to be outputted to said adjusting means for causing the power of said engine to be adjusted in response thereto when the load sensor signal is equal to or greater than a first predetermined value; and
(e) said control unit further includes means for comparing the rate of increase in the load applied to said shifter and for initiating a shift operation control process for said engine when said comparing means determines that the rate of increase of the load on said shifter exceeds a second predetermined value.

8. The system of claim 7, wherein:
(a) said load sensor outputs a first signal when said shifter is shifted from a lower to a higher geared orientation, and outputs a second signal when said shifter is shifted from a higher to a lower geared orientation.

9. The system of claim 7, wherein said engine further includes:
(a) a shift shaft operably connected to said transmission and a pedal operably connected to said shifter, with a linkage system extending between said shift shaft and said pedal; and
(b) said load sensor is operably associated with said linkage assembly.

10. The system of claim 8, wherein:
(a) said adjusting means is adapted for decreasing the power of said engine upon receipt of said first signal, and for increasing the power of said engine upon receipt of said second signal.

11. The system of claim 7, wherein:
(a) said adjusting means includes means for adjusting the ignition timing of said engine, and for adjusting the air intake rate of said engine.

12. The system of claim 7, wherein said engine further includes:
(a) a speed sensor for determining the speed of said engine, and a throttle sensor; and
(b) said control unit is operably associated with said speed and throttle sensors for outputting a control signal to said adjusting means in response thereto.

13. The system of claim 12, wherein:
(a) a position sensor is operably associated with said shifter for determining the geared orientation of said transmission; and
(b) said control unit is operably associated with said position sensor for outputting a further control signal to said adjusting means in response thereto.

* * * * *